United States Patent Office 2,793,424
Patented May 28, 1957

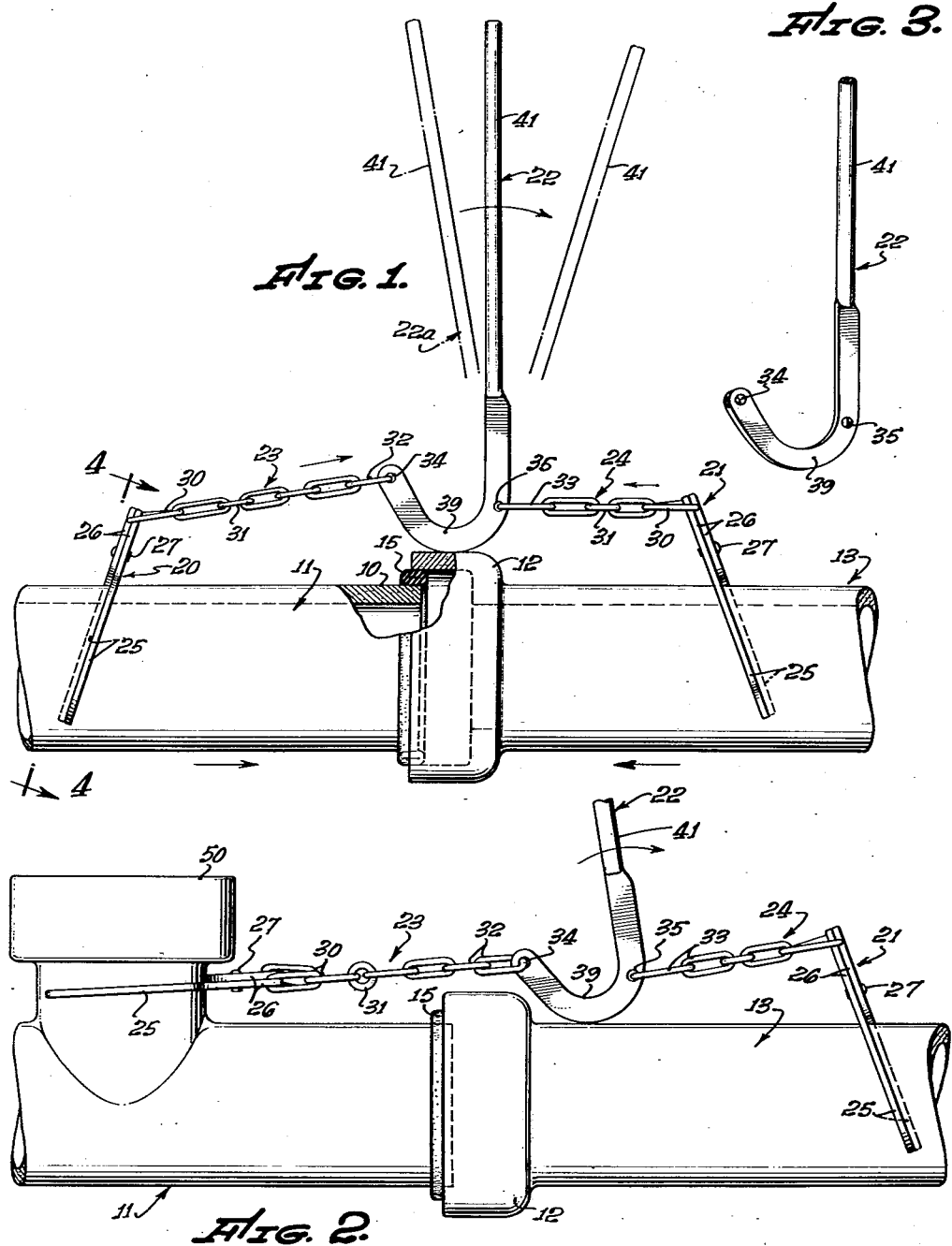

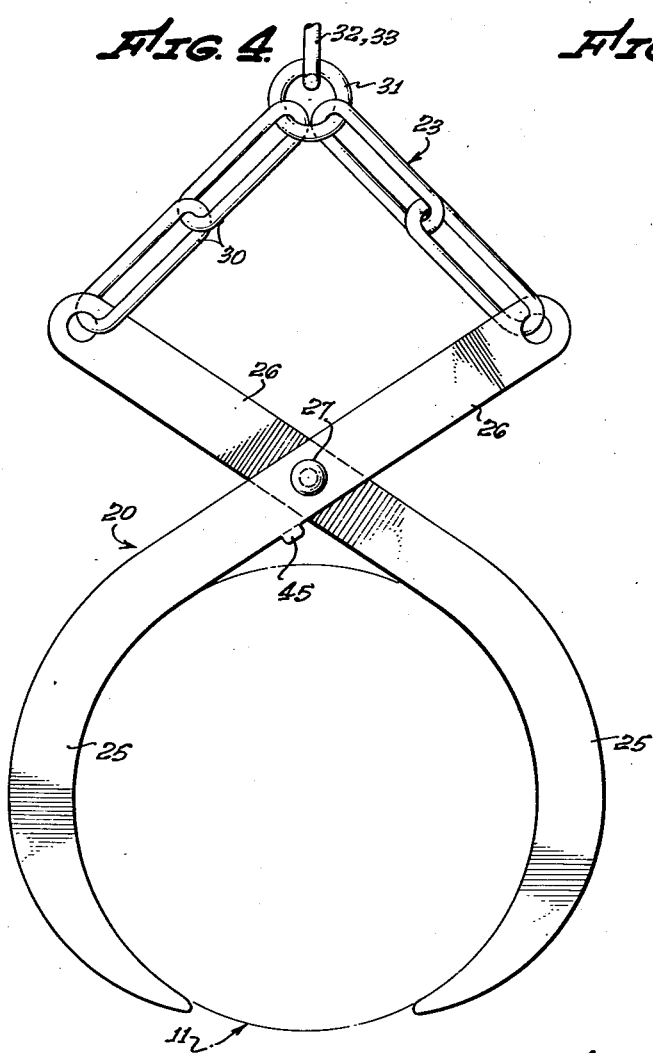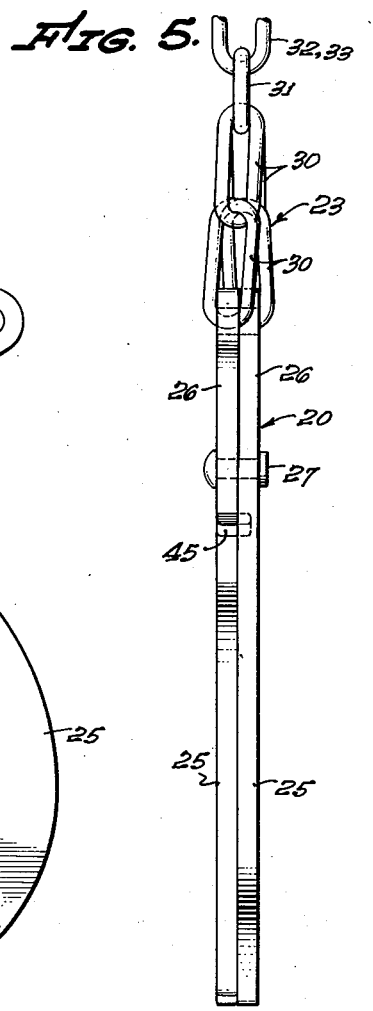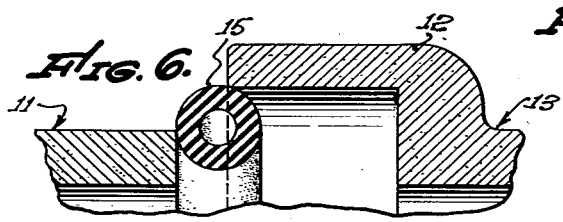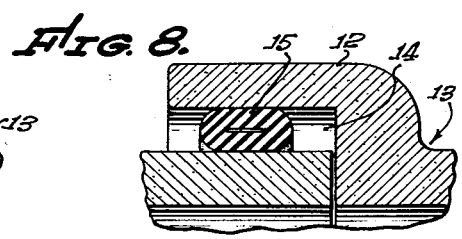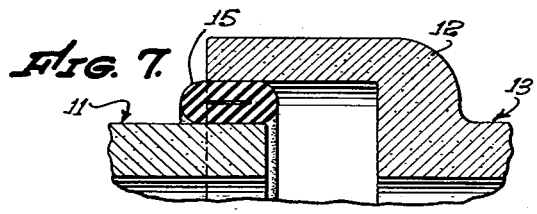
George E. Witte,
INVENTOR.

2,793,424

TOOL FOR ASSEMBLING AND SEALING ADJOINING DRAIN PIPE SECTIONS

George E. Witte, North Hollywood, Calif.

Application February 1, 1954, Serial No. 407,410

2 Claims. (Cl. 29—237)

This invention relates generally to the tool art and is concerned more particularly with a tool designed for drawing a pair of cylindrical members into coaxial, abutting relation. Specifically, the invention pertains to a tool for coupling the adjoining bell and spigot ends of a pair of drain- or sewer-pipe sections.

Vitrified clay pipe sections of the bell-and-spigot type are commonly joined in axial alignment by inserting the spigot end of one section into the bell end of the other section and applying cement mortar compound in the annular space that exists between the inside of the bell and the periphery of the spigot, the mortar hardening in place to retain the ends of the pipe sections in connected relation.

In my patent application, Serial No. 407,491, filed February 1, 1954, and entitled, Method of Joining and Sealing Pipe Sections, I have disclosed and claimed a specific method for applying a sealing ring between pipe sections. The instant application is directed to the tool employed for carrying out the method of sealing.

One object of the invention is to provide a tool which is designed to grip the adjoining bell and spigot ends of a pair of pipe sections and to draw one section axially toward the other section so as to force its spigot into the bell of the other section so as to compress a resilient, annular sealing element between the bell and spigot.

Another object of the invention is to provide a tool, of the character referred to, which consists of a pair of gripping elements, each adapted to grip a pipe section of the pair of sections to be joined, an operating lever having a curved fulcrum and adapted for pivotal rolling action against one of the pipe sections, and a flexible link means carried by each gripping element and so connected to the operating lever that pivotal movement thereof exerts opposite pulling forces on the links so as to draw the gripping elements toward each other and thus force the spigot into the bell.

Another object of the invention is to provide a tool of the class specified in which the gripping elements are of tong form, each having curved jaws engageable against opposite sides of a pipe section, said jaws having upper crossing arms to which the flexible link means is connected, the jaws of each element being tilted by the operating lever and link to cause them to dog firmly against the periphery of the pipe section to effect a positive gripping action.

Another object of the invention is to provide a pipe-assembling tool which is simple in construction and economical to manufacture, one which is strong and durable in use, and highly practical and efficient in performing its intended function.

Further objects of the invention will appear from the following description and from the accompanying drawings which are intended for the purpose of illustration only, and in which:

Fig. 1 is a side elevational view of a pair of sewer pipe sections, showing the present tool in the process of drawing the sections together into sealing engagement;

Fig. 2 is a view similar to Fig. 1, showing the pipe-assembling tool applied in a different manner;

Fig. 3 is a perspective view of the operating lever;

Fig. 4 is an enlarged side view of one of the gripping elements;

Fig. 5 is an edge view of the same; and

Figs. 6, 7 and 8 are fragmentary sectional views of the adjoining bell and spigot ends of a pair of pipe sections, illustrating the sealing means and method of applying the same in response to relative axial movement between the sections as effected by the present tool.

Referring to Fig. 1 of the drawings, the present tool is designed for joining the spigot end 10 of a pipe section 11 to the bell end 12 of a pipe section 13, the outside diameter of the spigot end being considerably less than the inside diameter of the bell end. According to the companion patent application referred to above, the annular space 14 between the bell 12 and spigot 10 is sealed by an annular sealing element 15 of tubular form (Figs. 6, 7 and 8). According to the method of said co-pending application to join the pipe sections, the sealing ring element 15 is first placed against the mouth of the bell 12 and it is to be noted by reference to Fig. 6 that the ouside diameter of the ring element is slightly larger than the inside diameter of the bell and that the inside diameter of the element is considerably smaller than the outside diameter of the spigot end 10. As explained in said application, forcing of the spigot end 10 into the bell 12 causes deformation of the sealing ring from its normally circular cross-sectional shape to a relatively flat cross-sectional contour, as shown in Fig. 7. As axial movement of the spigot 10 int othe bell is continued, the flattened ring 15 is caused to roll inwardly into the bell at a slower rate than the inward movement of the spigot 10. When the end of the spigot 10 is located completely within the bell 12, the compressed element 15 assumes a poistion intermediate the inner and outer ends of the bell as shown in Fig. 8 and provides an effective sealing of the annular space in which it is located to provide a leak-proof joint.

It is seen from the foregoing that the insertion of the sealing element 15 is accomplished in response to insertion of the spigot end 10 into the bell 12 to join the pipe section 11 to the pipe section 13. Due to the tight fit of the element 15 between the spigot and bell, considerable axial force is necessary to effect such joining of the pipe sections and it is very difficult to perform this operation manually, that is, without the assistance of a tool or other contrivance designed for the purpose. The present invention is concerned with a tool which may be employed to force the spigot end of a pipe section into the bell of an adjacent pipe section, the tool being constructed and operated in the manner explained hereinbelow.

Referring first to Figs. 1 and 2, the present tool consists generally of a pair of gripper elements 20 and 21 adapted to grip the pipe sections 11 and 13, an operating lever 22, and link means 23 and 24 operatively connected between the gripping elements and the operating lever.

Referring to Figs. 4 and 5, each gripping element 20 and 21 consists of a pair of curved jaws 25 which have straight upper extension arms 26. These straight arms 26 cross each other and are pivotally connected by a pin 27. Connected through holes at the free ends of the arms 26 are the end links of a chain loop 30 having a central connector link 31. The gripping elements 20 and 21 are generally similar to ice tongs, pivotal movement of the straight arms 26 toward each other causing the curved jaws 25 to be drawn together.

Connected to the links 31 of the chains 30 of the elements 20 and 21 are respective chain links 32 and 33. The links 32 are connected through holes 34 and 35 at opposite sides of the hook-like end 39 of the operating lever 22. A handle 41 projects from one side of the curved fulcrum end 39.

The tool may be employed in the manner illustrated in Fig. 1 to draw the pipe section 11 axially toward the pipe section 13 to couple these sections. To effect this result, the jaws of the gripping element 20 are opened and placed over the pipe section 11 to straddle the same. The other gripping element 21 is similarly placed to embrace the pipe section 13, the elements being so located axially of the pipe sections as to cause the linkages 32 and 33 to assume a taut condition when the operating lever 22 is in the slightly inclined position shown at 22a in Fig. 1. At this time, the sealing ring 15 is disposed against the mouth of the bell 12 and the end of the spigot 10 abuts the outer side of the sealing ring.

The handle 41 of the operating lever 22 is now pulled in the direction indicated by the arrow in Fig. 1 with the lever pivoting on its lower arcuate fulcrum 39 which rolls on a portion of the pipe section 13, for example on the bell mouth portion 12 thereof. During this pivotal movement of the lever 22, the points of connection 34 and 35 of the linkages 32 and 33 move in arcs and in opposite directions to draw the chain 30 of the left-hand gripping element 20 toward the right and the chain 30 of the right-hand gripping element 21 toward the left, as viewed in Fig. 1.

Pulling forces exerted on the chains 30 cause the jaws 25 of the elements 20 and 21 to pivot and contract around the respective pipe sections 11 and 13 to grip the same. At the same time, the elements 20 and 21 are tilted, as illustrated in Fig. 1, so as to cause the jaws to dog against upper and lower portions of the peripheries of the pipe sections.

Now, as the pivotal movement of the operating lever 22 is continued, the gripping elements 20 and 21 are drawn toward each other. Assuming that the pipe section 13 is already joined to a similar section of a pipe line and therefore is stationary, the pipe section 11 is moved axially toward the section 13 to force its spigot end 10 and the sealing ring 15 into the bell 12 to effect a secure and leakproof joint.

With the two pipe sections 10 and 11 thus joined, the tool is removed by reversing the pivotal movement of the operating lever 22 to slacken the chains 30, after which the jaws 25 are opened to free them from the pipe sections 11 and 13. Preferably, one jaw 25 of each gripping element is provided with a stop lug 45 which is engageable against the other jaw to limit the extent of opening of the jaws.

Referring now to Fig. 2, the tool may also be employed to couple a T pipe section 11' to the pipe section 13. In this case, the right-hand gripping element 21 is applied to the section 13, as explained above in connection with the procedure shown in Fig. 1, and the other gripping element 20 is caused to embrace a lateral branch 50 of the pipe section 11'. By pivoting the operating lever 22 in the direction of the arrow, the pipe section 11' is drawn toward the section 13 to force its spigot end 10 into the bell 12 to provide a leakproof connection.

Although only one specific embodiment of the invention has been disclosed herein, it will be understood that the invention is not limited thereto, but is capable of a variety of mechanical embodiments. Various changes which will now suggest themselves to those skilled in the art may be made in the material, form, details of construction, and arrangement of the elements without departing from the invention. It is therefore understood that the invention includes all forms thereof which come within the scope of the appended claims.

The invention claimed is:

1. A tool for connecting the bell and spigot ends of a pair of pipe sections by forcing the spigot end of one section into the bell of the other section, comprising: two pairs of gripping elements each pair having two curved, pivoted jaws for embracing opposite sides of a pipe section, said jaws having pivotally connected, crossing, extension arms diverging from the pivot; a chain connected between the ends of the arms of each gripping element; an operating lever having a substantially U-shaped end portion, the bottom of said U-shaped portion being curved to provide a fulcrum for rolling pivotal movement against an external surface of one of said pipe sections; and a pair of flexible linkages respectively connected between the legs of said substantially U-shaped fulcrum end and a said chain, said linkages being connected at opposited sides of the pivotal axis of said lever, pivotal movement of said lever in one direction drawing said pairs of gripping elements and pipe sections toward each other to force the spigot end of one section into the bell end of the other section.

2. A tool for connecting the bell and spigot ends of a pair of pipe sections by forcing the spigot end of one section into the bell of the other section, comprising: two pairs of gripping elements each pair having curved, pivoted jaws for embracing opposite sides of a pipe section, said jaws having pivotally connected, crossing, extension arms diverging from the pivot, said jaws and said extension arms of each pair substantially in a common plane; a chain connected between the ends of the arms of each pair of gripping elements; an operating lever having a curved substantially hook-shaped end the curved potrion of which provides a fulcrum for pivotal movement against an external surface of one of said pipe sections; and a pair of flexible linkages each connected between said hook-shaped end and a said chain, said linkages being connected respectively to spaced points on said hook-shaped lever end, said spaced points being located at opposite sides of the pivotal axis of said lever, pivotal movement of said lever in one direction drawing said pairs of gripping elements and pipe sections toward each other to force the spigot end of one section into the bell end of the other section.

References Cited in the file of this patent

UNITED STATES PATENTS

| | | |
|---|---|---|
| 558,752 | Adams | Apr. 21, 1896 |
| 870,931 | Claiborne | Nov. 12, 1907 |
| 1,242,950 | Knauss | Oct. 16, 1917 |
| 1,468,344 | Eckert | Sept. 18, 1923 |
| 1,518,769 | Brunk | Dec. 9, 1924 |
| 2,304,752 | Kirkland | Dec. 8, 1942 |